United States Patent
Li et al.

(10) Patent No.: US 10,767,808 B2
(45) Date of Patent: Sep. 8, 2020

(54) VARIABLE CURVED SURFACE BRACKET STRUCTURE AND CURVED DISPLAY DEVICE

(71) Applicant: HUIZHOU CHINA STAR OPTOELECTRONICS TECHNOLOGY CO., LTD., Huizhou Guangdong (CN)

(72) Inventors: Dehua Li, Huizhou Guangdong (CN); Gang Yu, Huizhou Guangdong (CN)

(73) Assignee: HUIZHOU CHINA STAR OPTOELECTRONICS TECHNOLOGIES CO., LTD., Huizhou (CN)

( * ) Notice: Subject to any disclaimer, the term of this patent is extended or adjusted under 35 U.S.C. 154(b) by 295 days.

(21) Appl. No.: 15/754,583

(22) PCT Filed: Jan. 24, 2018

(86) PCT No.: PCT/CN2018/074029
§ 371 (c)(1),
(2) Date: Feb. 22, 2018

(87) PCT Pub. No.: WO2019/136773
PCT Pub. Date: Jul. 18, 2019

(65) Prior Publication Data
US 2019/0383438 A1    Dec. 19, 2019

(30) Foreign Application Priority Data

Jan. 12, 2018   (CN) .......................... 2018 1 0032150

(51) Int. Cl.
*G02F 1/1333*   (2006.01)
*G06F 1/16*     (2006.01)
(Continued)

(52) U.S. Cl.
CPC ............. *F16M 11/18* (2013.01); *F16M 11/04* (2013.01); *F16M 11/22* (2013.01);
(Continued)

(58) Field of Classification Search
CPC ................. G06F 1/1601; G06F 1/1652; G02F 1/133305; G02F 2001/133328; G09G 2380/02
See application file for complete search history.

(56) References Cited

U.S. PATENT DOCUMENTS 9,081,540 B1 *   7/2015   Cho ...................... G06F 1/1601
9,116,662 B1 *   8/2015   Song ..................... G06F 1/1601
(Continued)

FOREIGN PATENT DOCUMENTS

CA      2747647 A1    1/2012
CN   103939717 A      7/2014
(Continued)

*Primary Examiner* — Adrian S Wilson
(74) *Attorney, Agent, or Firm* — Hemisphere Law, PLLC; Zhigang Ma

(57) ABSTRACT

A variable curved surface bracket structure is provided, including a base and a bracket, and the bracket is in contact with the back of the display screen; the bracket includes a fixed sheet and moving sheets respectively hinged on two sides of the fixed sheet. The variable curved surface bracket structure further includes a moving mechanism, disposed on the base and drivingly connected to the moving sheets to make the moving sheets rotate forward or backward relative to the fixed sheet. The moving mechanism includes a pushrod structure arranged on the base and includes a retractable pushrod and a driving device drivingly connected to the pushrod; at least a linkage strut assembly including at least a connecting rod and at least a strut. The disclosure
(Continued)

allows the curvature of the display screen in contact with the bracket to be adjustable, curved or planar, to meet different viewing needs.

18 Claims, 5 Drawing Sheets

(51) Int. Cl.
*F16M 11/18* (2006.01)
*F16M 11/04* (2006.01)
*F16M 11/22* (2006.01)
*G09F 9/30* (2006.01)
*G09F 9/35* (2006.01)

(52) U.S. Cl.
CPC ...... *G02F 1/133305* (2013.01); *G06F 1/1652* (2013.01); *G09F 9/301* (2013.01); *G02F 2001/133328* (2013.01); *G09F 9/35* (2013.01); *G09G 2380/02* (2013.01)

(56) References Cited

U.S. PATENT DOCUMENTS

| | | | |
|---|---|---|---|
| 9,123,290 B1* | 9/2015 | Cho | G06F 1/1652 |
| 9,148,950 B2* | 9/2015 | Park | H04M 1/0268 |
| 9,830,839 B2* | 11/2017 | Song | H04N 5/64 |
| 9,978,293 B2* | 5/2018 | Cho | H05K 5/0217 |
| 9,980,399 B2* | 5/2018 | Cho | G09F 9/301 |
| 2006/0006296 A1 | 1/2006 | Morita | |
| 2011/0155868 A1* | 6/2011 | Sun | F16M 11/08 248/125.7 |
| 2011/0249425 A1* | 10/2011 | Aurongzeb | F21V 14/02 362/102 |
| 2012/0281367 A1* | 11/2012 | He | H05K 5/02 361/728 |
| 2013/0044411 A1* | 2/2013 | Zhen | F16M 11/041 361/679.01 |
| 2013/0107159 A1* | 5/2013 | Cheng | F16M 11/046 349/58 |
| 2013/0155655 A1* | 6/2013 | Lee | H05K 5/03 362/97.1 |
| 2013/0207946 A1* | 8/2013 | Kim | G09G 3/3225 345/204 |
| 2014/0198465 A1 | 7/2014 | Park | |
| 2014/0354519 A1* | 12/2014 | Lee | G09F 9/301 345/76 |
| 2014/0376163 A1* | 12/2014 | Song | H04N 5/64 361/679.01 |
| 2015/0009635 A1* | 1/2015 | Kang | G09F 9/301 361/749 |
| 2015/0035812 A1* | 2/2015 | Shin | G09G 3/3688 345/204 |
| 2015/0043136 A1* | 2/2015 | Kim | G02F 1/133305 361/679.01 |
| 2015/0185761 A1* | 7/2015 | Song | G06F 1/1601 361/679.21 |
| 2015/0195932 A1* | 7/2015 | Lee | H05K 5/0217 361/749 |
| 2015/0296641 A1* | 10/2015 | Song | G06F 5/0217 361/679.01 |
| 2016/0040764 A1* | 2/2016 | Park | G09F 9/301 361/679.01 |
| 2016/0088743 A1* | 3/2016 | Zhang | H05K 5/0234 361/679.01 |
| 2016/0127674 A1* | 5/2016 | Kim | G09G 5/003 348/739 |
| 2016/0252236 A1* | 9/2016 | Chen | G02F 1/133 362/97.1 |
| 2016/0295711 A1* | 10/2016 | Ryu | G09F 9/301 |
| 2016/0353594 A1* | 12/2016 | Cho | F16M 11/08 |
| 2017/0193863 A1* | 7/2017 | Cho | H05K 5/0217 |

FOREIGN PATENT DOCUMENTS

| | | |
|---|---|---|
| CN | 105044957 A | 11/2015 |
| CN | 205090165 U | 3/2016 |
| CN | 205191117 U | 4/2016 |
| CN | 106205389 A | 12/2016 |
| CN | 106851158 A | 6/2017 |
| CN | 206237522 U | 6/2017 |
| KR | 20160145907 A | 12/2016 |
| WO | 2017209744 A1 | 12/2017 |

* cited by examiner

VARIABLE CURVED SURFACE BRACKET STRUCTURE AND CURVED DISPLAY DEVICE

RELATED APPLICATIONS

The present application is a National Phase of International Application Number PCT/CN2018/074029, filed Jan. 24, 2018, and claims the priority of China Application No. 201810032150.9, filed Jan. 12, 2018.

FIELD OF THE DISCLOSURE

The disclosure relates to the technical field of electrical equipment bracket structure, in particular to a variable curved bracket structure and a curved display device.

BACKGROUND

The screen of the existing liquid crystal display television (LCD TV) is a flat panel or a curved surface. The curved LCD TV display can provide an enveloping sense and three-dimensional sense and improve the visual experience of the customer. However, when the number of people watching at the same time becomes more, the viewing angle not near the center line of the curved surface becomes asymmetry, which affects the experience, then flat panel LCD TV is more suitable for the audience.

That is, the screen curvature of the existing LCD TV cannot be adjusted and cannot be suitable for many different viewing needs.

Therefore, the prior art still needs to be further developed.

SUMMARY

In view of the shortcomings of the existing technology, the purpose of the disclosure is to propose a structure with a variable curved surface so as to solve the problem that the curvature of the screen of the existing liquid crystal television cannot be adjusted and cannot be suitable for many different viewing needs.

To achieve the object, the disclosure adopts the following technical solutions:

a variable curved surface bracket structure includes a base and a bracket arranged on the base, and the bracket is in contact with the back of the display screen, the bracket includes a fixed sheet and moving sheets respectively hinged on two sides of the fixed sheet; the variable curved bracket structure further includes a moving mechanism disposed on the base and drivingly connected to the moving sheets so that the moving sheets rotate forward or backward relative to the fixed sheet.

The moving mechanism includes: a pushrod structure arranged on the base and including a retractable pushrod and a driving device in driving connection with the pushrod;

at least a linkage strut assembly includes at least a connecting rod and at least a strut, an end of the connecting rod is rotatably connected to the pushrod and another end of the connecting rod is connected to the strut, two ends of the strut are respectively connected to the moving sheets respectively hinged on two sides of the fixed sheet.

The linkage strut assembly further includes a rod bush and a cam wheel, the rod bush is arranged in the fixed sheet, the strut penetrates into the rod bush and rotates relative to the rod bush, two ends of the strut are respectively disposed with the cam wheels and abut against the moving sheets, the cam wheels rotate to push the moving sheets forward or to move the moving sheets backward.

The linkage strut assembly includes two sets, respectively arranged on upper and lower sides of the bracket.

each of the linkage strut assembly includes a first connecting rod, a second connecting rod, a first strut, a second strut, a first rod bush, a first cam wheel, and a second cam wheel, the first strut and the second strut are both disposed through the first rod bush, an end of the first connecting rod is rotatably connected to a side connecting the pushrod, another end of the first connecting rod is connected to the first strut, an end of the second connecting rod is rotatably connected to a side opposite to a side connecting the pushrod and the first connecting rod, another end of the second connecting rod is connected to the second strut, the first cam wheel is arranged on a rod end of a side of the first strut opposite to a side of the first strut connected to the first connecting rod, and the second cam wheel is arranged on a rod end of a side of the second strut opposite to a side of the second strut connected to the second connecting rod;

the moving sheets include a first moving sheet and a second moving sheet, the first moving sheet hinged with a side of the fixed sheet adjacent to the first cam wheel and abutting against the first cam wheel, and the second moving sheet hinged with a side of the fixed sheet adjacent to the second cam wheel and abutting against the second cam wheel.

A first transfer rod is rotatably connected between the first connecting rods of the two sets of the linkage strut assemblies, a second transfer rod is rotatably connected between the second connecting rods of the two sets of the linkage strut assemblies; a balance rod is also connected between the first transfer rod and the second transfer rod.

the first connecting rod, the second connecting rod, and the pushrod are further disposed with a sliding groove at a rotating connection, the pushrod is disposed with a pin, the pin penetrates the sliding groove of the first and the second connecting rods fixed on an upper side of the fixed sheet.

A plurality of elastic hinges is disposed at a hinged junction of the fixed sheet and the moving sheets.

Each of the moving sheets is disposed with a screen supporting barb.

The driving device is driven by an electric motor, and the electric motor is electrically connected to a control circuit to control expansion and contraction of a push rod.

The disclosure also provides a curved display device including a variable curved surface bracket structure as described above and a display screen mounted on the variable curved surface bracket structure.

In the variable curved bracket structure of the technical proposal of the disclosure, by arranging the bracket as a fixed sheet and moving sheets hinged with the fixed sheet, and arranging a retractable pushrod and a connecting rod rotatably connected to the pushrod, the ends of the connecting rods are connected to the struts, both ends of the strut abuts against the moving sheets, the strut moves forward or rotates under the action of the connecting rod, and drives the moving sheets to rotate forward or backward, thus the curvature of the display screen in contact with the bracket can be adjusted, curved or flattened to meet different viewing needs.

BRIEF DESCRIPTION OF THE DRAWINGS

To illustrate technical schemes of the disclosure or the prior art more clearly, the following section briefly introduces drawings used to describe the embodiments and prior art. Obviously, the drawing in the following descriptions is just some embodiments of the disclosure. The ordinary person in the related art can acquire the other drawings according to these drawings without offering creative effort.

EXPLANATION OF REFERENCE NUMERALS

Figure 1:
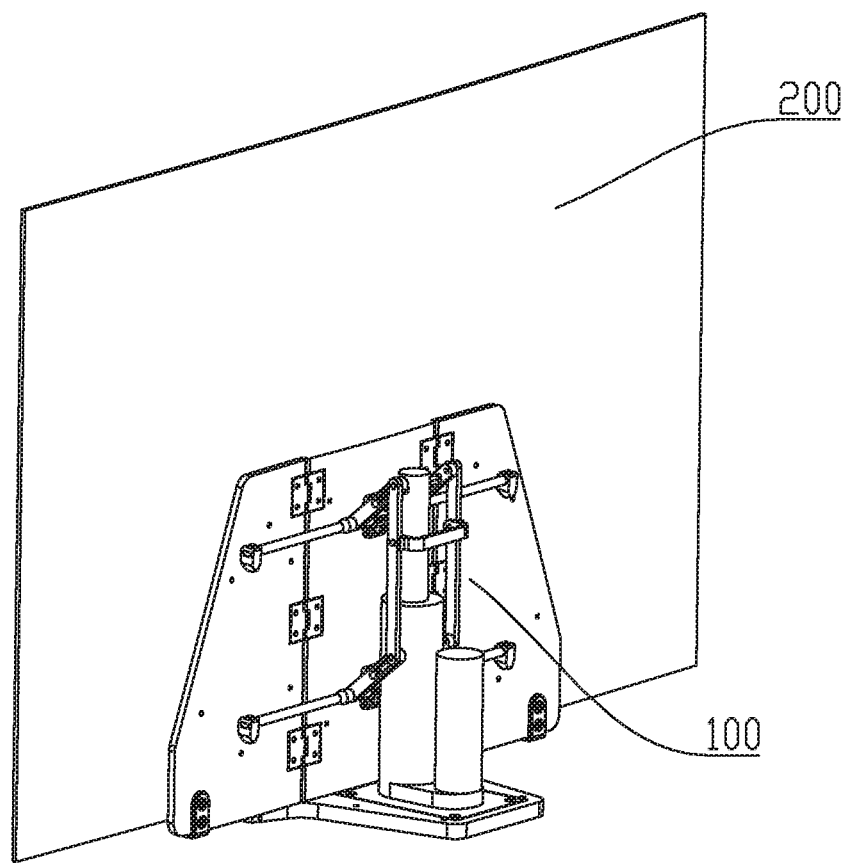
FIG. 1 is a schematic diagram of a variable curved surface bracket structure and a display screen in a flat state according to the disclosure.

| Label | name |
|---|---|
| 100 | Bracket structure |
| 10 | Base |
| 20 | Bracket |
| 21 | Fixed sheet |
| 22 | moving sheet |
| 22a | First moving sheet |
| 22b | Second moving sheet |
| 30 | Pushrod structure |
| 31 | Pushrod |
| 311 | Pin |
| 32 | Driving device |
| 40 | Linkage strut assembly |
| 41 | Connecting rod |
| 41a | First connecting rod |
| 41b | Second connecting rod |
| 42 | Strut |
| 42a | First strut |
| 42b | Second strut |
| 43 | Rod bush |
| 43a | First rod bush |
| 44 | Cam wheel |
| 44a | First cam wheel |
| 44b | Second cam wheel |
| 51 | First transfer rod |
| 52 | Second transfer rod |
| 53 | Balance rod |
| 60 | Elastic hinge |
| 70 | Screen supporting barb |
| 200 | Display screen |

The realization, functional features and advantages of the objectives of the disclosure will be further described in conjunction with embodiments and with reference to the accompanying drawings.

DETAILED DESCRIPTION OF PREFERRED EMBODIMENTS

The following sections offer a clear, complete description of this disclosure in combination with the embodiments and accompanying drawings. Obviously, the embodiments described herein are only a part of, but not all the embodiments of this disclosure. In view of the embodiments described herein, any other embodiment obtained by those of ordinary skill in the art skilled in this art without offering creative effort is included in a scope claimed by this disclosure.

It should be noted that, all directional indicators (such as upper, lower, left, right, front, rear, . . . ) in the embodiments of the disclosure are merely used to explain the differences between the components in a specific posture (as shown in the drawings) regarding the positional relationship, the movement situation and the like, if the specific posture changes, the directivity indication also changes accordingly.

In the disclosure, the terms "connected", "fixed" and the like should be broadly understood unless expressly stated and limited otherwise. For example, "fixed" may be a fixed connection, a detachable connection, or a unitary one; it may be a mechanical connection or an electrical connection; it may be directly connected or indirectly connected through an intermediary medium and may be the interconnection of two elements or the interaction of the two elements unless expressly limited otherwise. For those skilled in the art, the specific meanings of the terms in the disclosure may be understood based on specific situations.

In addition, the description of the "first", the "second", and the like in the disclosure are merely for the purpose of description and are not to be construed as indicating or implying any relative importance or implied reference to the number of indicated technical features, Thus, features defining "first" and "second" may explicitly or implicitly include at least one of the features. In addition, the technical solutions between the various embodiments may be combined with each other, but they must be based on the implementation that can be implemented by those skilled in the art. When the combinations of the technical solutions appear, contradictory or cannot be implemented, it should be considered that the combination of the technical solutions does not exist, nor is it within the protection scope of the disclosure.

Figure 2:
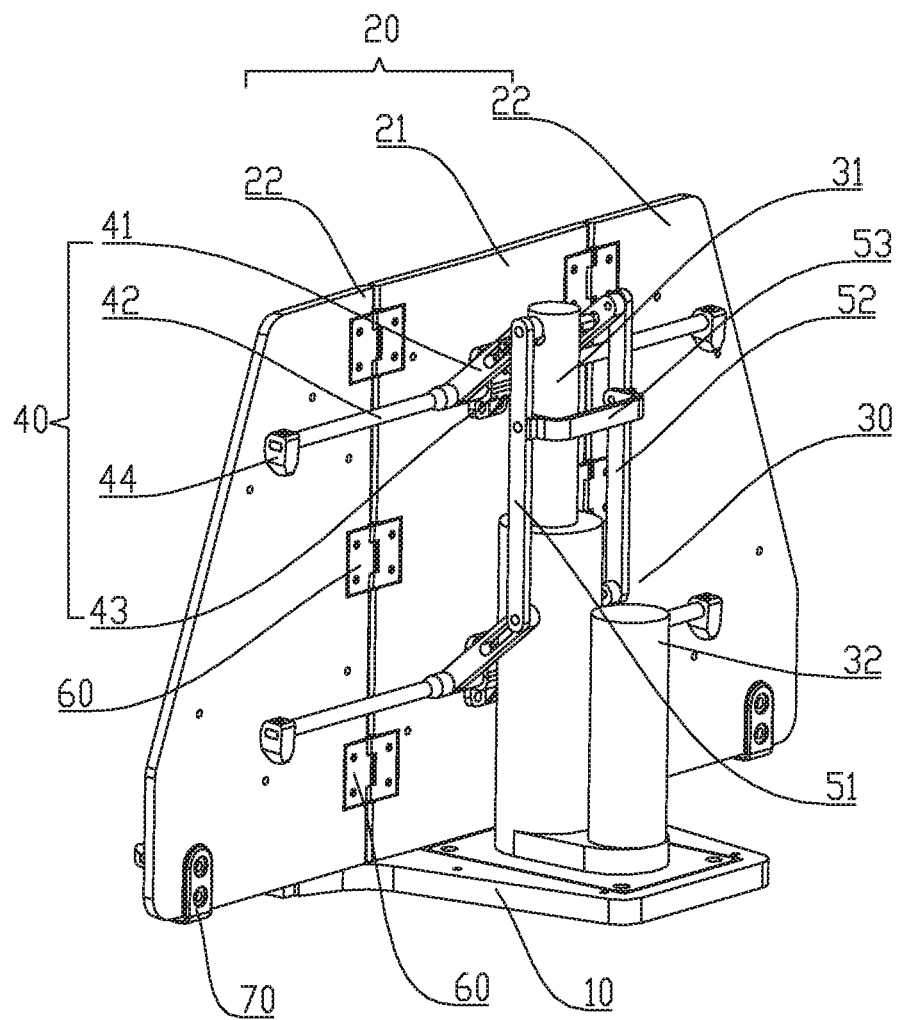
FIG. 2 is structural diagram of the variable curved surface bracket structure in a flat state according to the disclosure.
Figure 3:
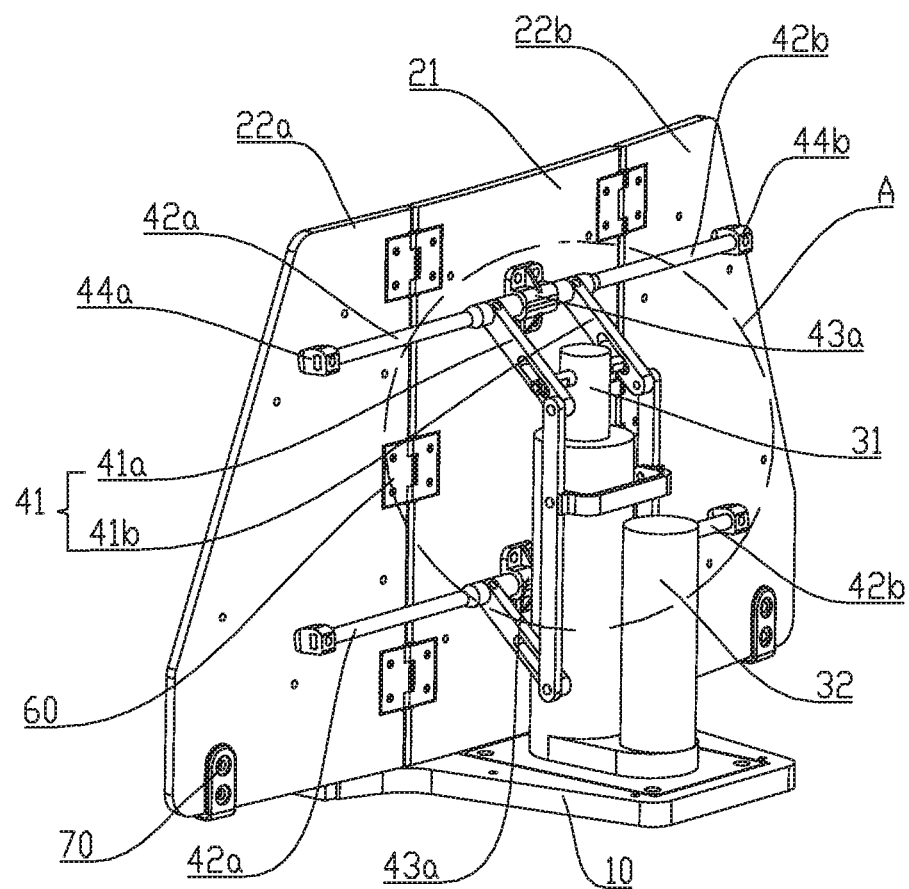
FIG. 3 is structural diagram of a variable curved surface bracket structure in a curved state according to the disclosure.

Referring to FIG. 1 to FIG. 3, the disclosure provides a variable curved surface bracket structure 100, which includes a base 10 and a bracket 20 disposed on the base 10. The bracket 20 is in contact with the back of the display 200. The display screen 200 of the disclosure is designed to have a certain degree of flexibility, can be arbitrarily converted from the plane to a certain range of curvature. The bracket 20 includes a fixed sheet 21 and moving sheets 22 respectively hinged with two sides of the fixed sheet 21. The variable curved bracket structure 100 further includes a moving mechanism disposed on the base 10 and driven by the moving sheets 22 so that the moving sheets 22 are rotated forward or backward relative to the fixed sheet 21. The moving mechanism can adopt a variety of structural designs, such as pushing the moving sheets by hydraulic or electric driving a pushrod or pulling back the moving sheets backward to realize the function of turning the moving sheets forward or backward. When the moving sheets on both sides of the fixed sheet rotate forward relative to the fixed sheet, the curvature of the display screen will be larger. When the moving sheets on both sides of the fixed sheet is returned backward, the curvature of the display screen becomes smaller until the display screen becomes a flat state, thus the display screen may be adjusted between the flat state and a certain range of curved to be suitable for the demand in different occasions.

In the variable curved bracket structure provided by the technical solution of the disclosure, the moving sheets are hinged with two sides of the fixed sheet by dividing the bracket into a fixed sheet and two moving sheets, and a moving mechanism is provided. The moving mechanism is in driving connection with the moving sheets, the moving mechanism drives the moving sheets to rotate backward or forward backward so that the curvature of the display screen contacting the bracket can be adjusted and can be turned into a curved surface or a flat surface for different use occasions to meet different viewing requirements.

Referring to FIG. 2, the moving mechanism includes: a pushrod structure 30, disposed on the base 10, including a retractable pushrod 31 and a driving device 32 drivingly connected to the pushrod 31; and at least a linkage strut assembly 40 including at least a connecting rod 41 and at least a strut 42. An end of the connecting rod 41 is rotatably connected to the pushrod 31, and another end of the connecting rod 41 is connected to the strut 42. Two ends of the strut 42 are respectively connected to the moving sheets 22 on both sides of the fixed sheet 21, the strut 42 makes the moving sheets rotate forward or return backward. The strut 42 of the disclosure moves forward or rotates under the action of the connecting rod 41 to drive the moving sheets 22 to rotate forward or backward so that the curvature of the display screen 200 in contact with the bracket 20 can be adjusted and can be curved also can be flat, thereby being suitable for different occasions to meet different viewing needs.

The driving device 32 of the disclosure can adopt manual adjustment or electric adjustment, and the stretching of the pushrod 31 can be hydraulic or pneumatic. Preferably, the driving device 32 is driven by an electric motor, and the electric motor is electrically connected to a control circuit to control stretching of a pushrod 31.

The linkage strut assembly 40 further includes a rod bush 43 and cam wheels 44. The rod bush 43 is disposed on the fixed sheet 21. The strut 42 penetrates the rod bush 43 and rotates relative to the rod bush 43. Two ends of the strut 42 are respectively disposed with the cam wheels 44 and abut against the moving sheets 22, and the cam wheels 44 rotate to push the moving sheets 22 forward or to move the moving sheets 22 backward. The rotation of the connecting rod 41 drives the strut 42 to relatively rotate on the rod bush 43 and simultaneously drives the cam wheels 44 at both ends of the strut 42 to rotate. Since the cam wheels 44 and the moving sheets 22 resist, and due to the structural characteristics of the cam wheels 44, During the rotation, the moving sheets 22 are pushed forward or the moving sheets 22 are returned backward to complete the curvature transformation between the fixed sheet 21 and the moving sheets 22. Since the cam wheels 44 abut against the moving sheets 22, and simultaneously due to the structural characteristics of the cam wheels 44, the moving sheets 22 are pushed forward or the moving sheets 22 are pushed backward by the rotation of the cam wheels 44 so as to complete the curvature transformation between the fixed sheet 21 and the moving sheets 22.

Preferentially, in the embodiment of the disclosure, the linkage strut assembly 40 includes two sets, respectively arranged on the upper and lower sides of the bracket 20. The arrangement of the two sets of linkage strut assembly 40 makes the stress on the moving sheets 22 more balanced.

Figure 5:
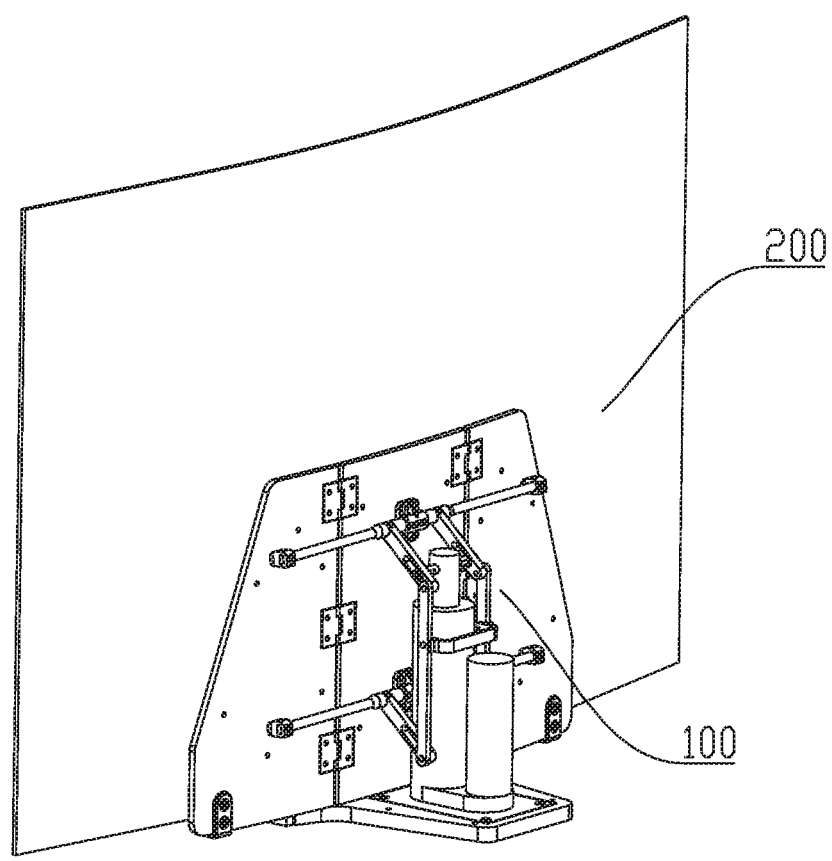
FIG. 5 is a schematic diagram of a curved surface structure of a variable curved bracket structure and a display screen according to the disclosure.

Specifically; referring to FIG. 3, each of the linkage strut assemblies 40 includes a first connecting rod 41a, a second connecting rod 41b, a first strut 42a, a second strut 42b, a first rod bush 43a, a first cam wheel 44a, and a second cam wheel 44b. The first strut 42a and the second strut 42b both penetrate into the first rod bush 43a. One end of the first connecting rod 41a is rotatably connected to a side connecting the pushrod 31, another end of the first connecting rod 41a is connected to the first strut 42a, one end of the second connecting rod 41b is rotatably connected to a side opposite to a side connecting the pushrod 31 and the first connecting rod 41a; another end of the second connecting rod 41b is connected to the second strut 42b; the first cam wheel 44a is arranged on a rod end of a side of the first strut 42a opposite to a side of the first strut 42a connected to the first connecting rod 41a, and the second cam wheel 44b is arranged on a rod end of a side of the second strut 42b opposite to a side of the second strut 42b connected to the second connecting rod 41b;

The moving sheets include a first moving sheet 22a and a second moving sheet 22b, the first moving sheet 22a hinged with a side of the fixed sheet 21 adjacent to the first cam wheel 44a and abutting against the first cam wheel 44b, and the second moving sheet 44b hinged with a side of the fixed sheet 21 adjacent to the second cam wheel 44b and abutting against the second cam wheel 44b. The rotation of the first cam wheel 44a drives the first moving sheet 22a to rotate relative to the fixed sheet 21 and the rotation of the second cam wheel 44b causes the second moving sheet 22a to rotate relative to the fixed sheet 21 so as to complete the curvature adjustment of the first moving sheet 22a and the second moving sheet 22b with respect to the fixed sheet 21 thereby achieving the curvature adjustment of the display screen 200. As shown in FIG. 5, the first moving sheet 22a and the second moving sheet 22b are rotated forward relative to the fixed sheet 21 to form a certain curvature. In this case, the display screen 200 mounted on the bracket 20 also has a corresponding curved surface.

Figure 4:
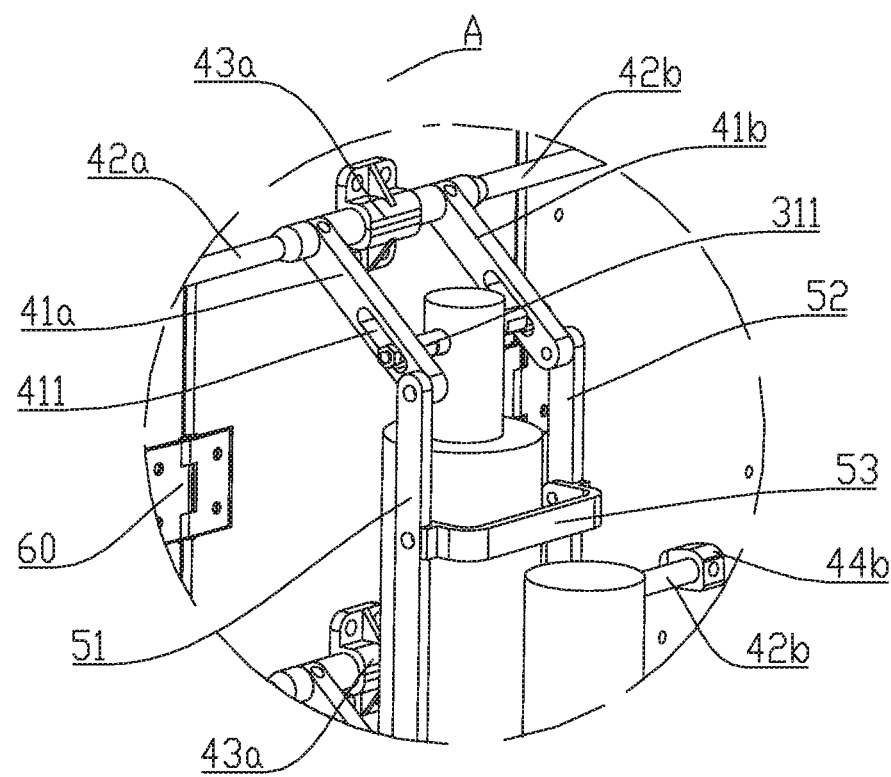
FIG. 4 is an enlarged schematic diagram of A in FIG. 3.

Further, as shown in FIG. 4, the first transfer rod 51 is rotatably connected between the first connecting rods 41a of the two sets of the linkage strut assemblies 40, and the second connecting rod 52 is rotatably connected between the second connecting rod 41b of the two sets of the linkage strut assemblies 40; a balance rod 53 is connected between the first transfer rod 51 and the second transfer rod 52, The setting of the transfer rod and the balance rod makes the synchronization of the transmission between the upper and lower sets of the linkage strut assemblies of the bracket smoother and the transmission more stable and improves the reliability of the transmission.

Continued to refer to FIG. 4, the first connecting rod 41a and the second connecting rod 41b and the pushrod 31 are further disposed with a sliding groove 411 at a rotating connection, the pushrod 31 is disposed with a pin 311, the pin 31 penetrates the sliding groove 411 of the first connecting rod 41a and the second connecting rod 41b fixed on an upper side of the fixed sheet 21. The setting of the sliding groove 411 makes the variation of the curvature range of the moving sheets 22 relative to the fixed sheet 21 adjustable.

Preferably, as shown in FIG. 3 and FIG. 4, an elastic hinge 60 is disposed at the hinge of the fixed sheet 21 and the moving sheets 22, A plurality of elastic hinges 60 may be disposed, and the elastic hinges 60 provide resilience so that the moving sheets keep in close contact with the cam wheels after the rotation.

In the embodiments of the disclosure, both the fixed sheet 21 and the moving sheets 22 are flat sheets, so that the contact between the bracket 20 and the display screen 200 is the surface contact, and the display screen is more evenly stressed during the adjustment of the curved surface to protect the display screen.

Preferably, a screen supporting barb 70 is disposed on the moving sheets 22, The screen supporting barb 70 facilitates the mounting and fixing of the display screen 200 and the variable curved bracket structure 100.

The foregoing descriptions are merely some embodiments of the disclosure and are not intended to limit the scope of the disclosure. All equivalent structural changes made by the present specification and the accompanying drawings under the inventive concept of the disclosure or direct/indirect application in other related technical fields are included in the protection scope of the disclosure.

What is claimed is:

1. A variable curved surface bracket structure comprising:
a base; and
a bracket arranged on the base;
wherein the bracket is in contact with a back of a display screen, and the bracket comprises a fixed sheet and a plurality of moving sheets respectively hinged on two sides of the fixed sheet;
wherein the variable curved bracket structure further comprises a moving mechanism, disposed on the base and drivingly connected to the moving sheets to make the moving sheets rotate forward or backward relative to the fixed sheet; and
wherein the moving mechanism comprises: a pushrod structure, arranged on the base, comprising a retractable pushrod and a driving device drivingly connected to the pushrod; at least a linkage strut assembly comprises at least a connecting rod and at least a strut, wherein an end of the connecting rod is rotatably connected to the pushrod and another end of the connecting rod is connected to the strut, two ends of the strut are respectively connected to the moving sheets respectively hinged on two sides of the fixed sheet.

2. The variable curved surface bracket structure according to claim 1, wherein the linkage strut assembly further comprises a rod bush and a plurality of cam wheels, the rod bush is arranged on the fixed sheet, the strut penetrates into the rod bush and rotates relative to the rod bush, the two ends of the strut are respectively disposed with the cam wheels and abut against the moving sheets, the cam wheels rotate to push the moving sheets forward or to move the moving sheets backward.

3. The variable curved surface bracket structure according to claim 2, wherein the linkage strut assembly comprises two sets, respectively arranged on upper and lower sides of the bracket.

4. The variable curved surface bracket structure according to claim 3, wherein each of the linkage strut assemblies comprises a first connecting rod, a second connecting rod, a first strut, a second strut, a first rod bush, a first cam wheel, and a second cam wheel, the first strut and the second strut both penetrate into the first rod bush, an end of the first connecting rod is rotatably connected to a side of the pushrod, another end of the first connecting rod is connected to the first strut, an end of the second connecting rod is rotatably connected to a side of the pushrod opposite to the side of the pushrod connected to the first connecting rod, another end of the second connecting rod is connected to the second strut, the first cam wheel is arranged on a rod end of a side of the first strut opposite to a side of the first strut connected to the first connecting rod, and the second cam wheel is arranged on a rod end of a side of the second strut opposite to a side of the second strut connected to the second connecting rod;
wherein the moving sheets comprise a first moving sheet and a second moving sheet, the first moving sheet is hinged with a side of the fixed sheet adjacent to the first cam wheel and abuts against the first cam wheel, and the second moving sheet is hinged with a side of the fixed sheet adjacent to the second cam wheel and abuts against the second cam wheel.

5. The variable curved surface bracket structure according to claim 4, wherein a first transfer rod is rotatably connected between the first connecting rods of the two sets of the linkage strut assemblies, a second transfer rod is rotatably connected between the second connecting rods of the two sets of the linkage strut assemblies; a balance rod is also connected between the first transfer rod and the second transfer rod.

6. The variable curved surface bracket structure according to claim 5, wherein the first connecting rod, the second connecting rod, and the pushrod are further disposed with a sliding groove at a rotating connection, the pushrod is disposed with a pin, and the pin penetrates into the sliding groove of the first connecting rod and the second connecting rod fixed on an upper side of the fixed sheet.

7. The variable curved surface bracket structure according to claim 1, wherein a plurality of elastic hinges is disposed at a hinged junction of the fixed sheet and the moving sheets.

8. The variable curved surface bracket structure according to claim 1, wherein each of the moving sheets is disposed with a screen supporting barb.

9. The variable curved surface bracket structure according to claim 1, wherein the driving device is driven by an electric motor, and the electric motor is electrically connected to a control circuit to control stretching of a pushrod.

10. A curved display device comprising:
a variable curved surface bracket structure; and
a display screen mounted on the variable curved surface bracket structure;
wherein the variable curved surface bracket structure comprises a base and a bracket arranged on the base, wherein the bracket is in contact with a back of the display screen;
wherein the bracket comprises a fixed sheet and moving sheets respectively hinged on two sides of the fixed sheet;
wherein the variable curved surface bracket structure further comprises a moving mechanism, disposed on the base and drivingly connected to the moving sheets to make the moving sheets rotate forward or backward relative to the fixed sheet so as to adjust a curvature of the display screen; and
wherein the moving mechanism comprises a pushrod structure, arranged on the base, comprising a retractable pushrod and a driving device drivingly connected to the pushrod and at least a linkage strut assembly comprising at least a connecting rod and at least a strut, wherein an end of the connecting rod is rotatably connected to a side of the pushrod, another end of the connecting rod is connected to the strut, the two ends of the strut are respectively connected to the moving sheets respectively hinged on two sides of the fixed sheet.

11. The curved display device according to claim 10, wherein the linkage strut assembly further comprises a rod bush and cam wheels, the rod bush is arranged on the fixed sheet, the strut penetrates into the rod bush and rotates relative to the rod bush, two ends of the strut are respectively disposed with the cam wheels and abuts against the moving sheets, the cam wheels rotate to push the moving sheets forward or to move the moving sheets backward.

12. The curved display device according to claim 11, wherein the linkage strut assembly comprises two sets, respectively arranged on upper and lower sides of the bracket.

13. The curved display device according to claim 12, wherein each of the linkage strut assemblies comprises a first connecting rod, a second connecting rod, a first strut, a second strut, a first rod bush, a first cam wheel, and a second cam wheel, the first strut and the second strut both penetrate into the first rod bush, an end of the first connecting rod is rotatably connected to a side of the pushrod, another end of the first connecting rod is connected to the first strut, an end of the second connecting rod is rotatably connected to a side of the pushrod opposite to the side of the pushrod connected to the first connecting rod, another end of the second connecting rod is connected to the second strut, the first cam wheel is arranged on a rod end of a side of the first strut opposite to a side of the first strut connected to the first connecting rod, and the second cam wheel is arranged on a rod end of a side of the second strut opposite to a side of the second strut connected to the second connecting rod;

wherein the moving sheets comprise a first moving sheet and a second moving sheet, the first moving sheet is hinged with a side of the fixed sheet adjacent to the first cam wheel and abuts against the first cam wheel, and the second moving sheet is hinged with a side of the fixed sheet adjacent to the second cam wheel and abuts against the second cam wheel.

14. The curved display device according to claim 13, wherein a first transfer rod is rotatably connected between the first connecting rods of the two sets of the linkage strut assemblies, a second transfer rod is rotatably connected between the second connecting rods of the two sets of the linkage strut assemblies; and a balance rod is also connected between the first transfer rod and the second transfer rod.

15. The curved display device according to claim 14, wherein the first connecting rod, the second connecting rod, and the pushrod are further disposed with a sliding groove at a rotating connection, the pushrod is disposed with a pin, and the pin penetrates the sliding groove of the first connecting rod and the second connecting rod fixed on an upper side of the fixed sheet.

16. The curved display device according to claim 10, wherein a plurality of elastic hinges is disposed at a hinged junction of the fixed sheet and the moving sheets.

17. The curved display device according to claim 10, wherein each of the moving sheets is disposed with a screen supporting barb.

18. The curved display device according to claim 10, wherein the driving device is driven by an electric motor, and the electric motor is electrically connected to a control circuit to control stretching of a pushrod.

\* \* \* \* \*